May 25, 1965 W. C. MURR ETAL 3,184,960
ELECTRIC TONOMETER
Filed July 15, 1963
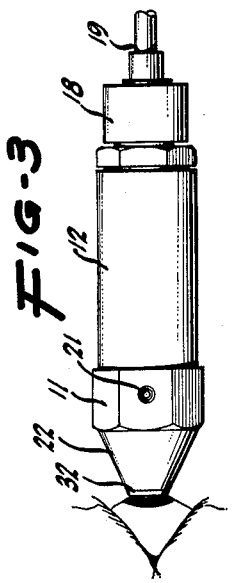
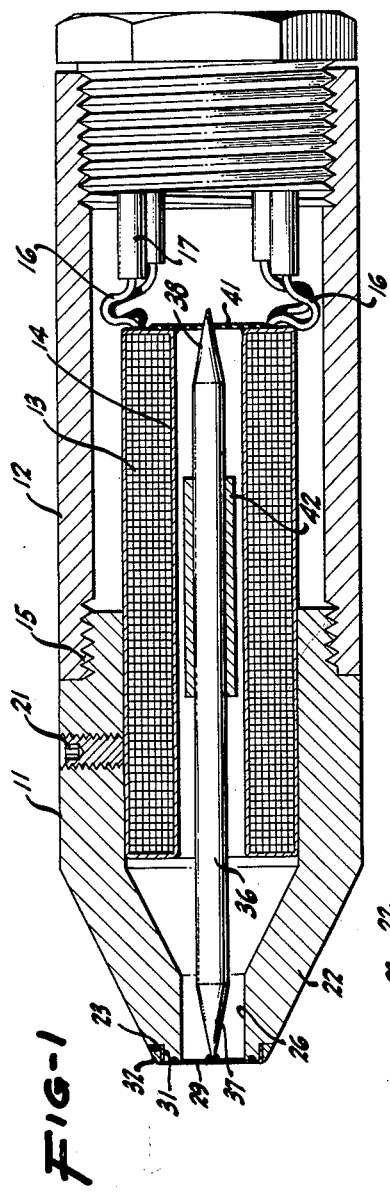
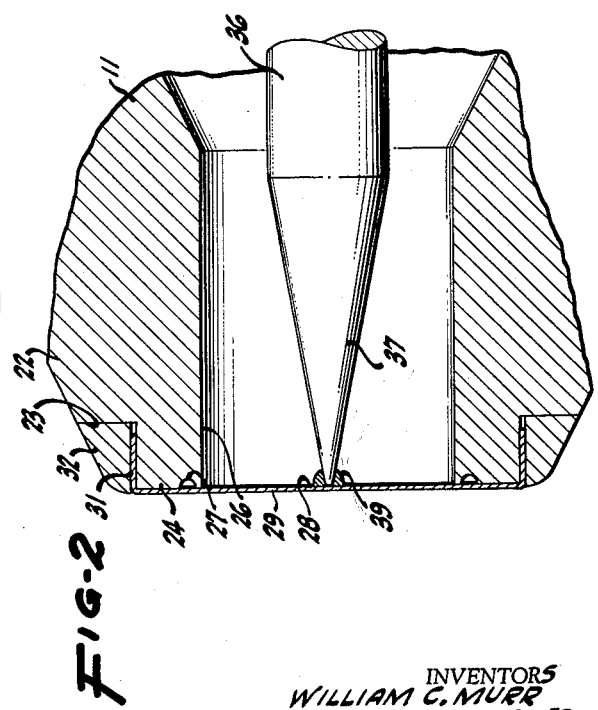
INVENTORS
WILLIAM C. MURR
GEORGE J. EILERS, JR.
BY
*Julian Caplan*
ATTORNEY United States Patent Office 3,184,960
Patented May 25, 1965

3,184,960
ELECTRIC TONOMETER
William C. Murr, El Sobrante, and George J. Eilers, Jr., Oakland, Calif., assignors to Bio-Engineering, Inc., Berkeley, Calif.
Filed July 15, 1963, Ser. No. 294,964
5 Claims. (Cl. 73—80)

This invention relates to a new and improved electronic tonometer of the type used in the diagnosis of glaucoma. The function of the instrument is to test the internal pressure of the eyeball by flattening a portion of the surface of the eyeball and measuring the intraocular pressure at the flat portion.

In general, the present invention is related to that type of tonometer whereby an annular tip of the instrument is provided with a central probe carrying an armature interiorly of the instrument which excites the field of a differential transformer. The annular end of the probe flattens the eyeball and the intraocular pressure acting upon the central probe causes movement of the armature which is dependent upon said pressure. The excitation of the differential transformer is amplified and may be suitably recorded for diagnostic purposes by instruments commercially available. In conventional instruments of this type there is a slight annular gap between the probe and the surrounding annular tip of the instrument, which may be a source of cross-infection of patients and is usually closed off by a disposable sheath for sanitary purposes. Principal features and advantages of the present invention eliminate the foregoing objections to prior instruments. The open annular gap is eliminated and the end of the nose piece of the instrument is enclosed by a highly flexible stainless steel diaphragm of a construction such that it may be sterilized and hence is a permanent part of the instrument.

The present invention has the principal advantages of previously used tonometers of this general type. For example, the device rapidly and accurately measures the intraocular pressure. Use of the instrument flattens a portion of the eyeball without danger or discomfort to the patient and without requiring administration of an anesthetic. Flattening of the eyeball eliminates inaccuracies in measurement of pressure due to bending forces of the cornea and, further, the surface tension effects of tears are also avoided as a factor of error in the pressure reading. In addition, corneal astigmatism is not significant in the accuracy of the reading. Another important feature of the invention is the fact that the skill required to operate the same is minimal and it is unnecessary that the operator be a medical doctor.

Features of the present invention which are not present in prior devices include the fact that, by reason of the absence of an exposed annular gap between the probe and annular tip of the instrument, cleaning and sterilizing the device is simplified and the use of a disposable sheath is eliminated.

A further feature is the fact that there is no possibility of the annular gap becoming clogged and hence no possibility that the accuracy of the reading of the deflection of the probe will be affected by such clogging.

A still further feature of the invention is the fact that the device is more sensitive than prior devices and hence the reading is more accurate.

Still another feature of the invention is the fact that the presence of the metal closure for the end of the probe makes the application of the instrument to the eye more comfortable.

A still further feature of the invention is the elimination of any danger of injury to the cornea by reason of the elimination of the aforementioned gap.

Other objects of the present invention will become apparent upon reading the following specification and referring to the accompanying drawings in which similar characters of reference represent corresponding parts in each of the several views.

In the drawings:

FIG. 1 is a longitudinal sectional view of the probe of the present invention.

FIG. 2 is an enlarged fragmentary sectional view of the extreme outer end of the instrument.

FIG. 3 is a schematic view showing application of the instrument to the eyeball.

The present instrument comprises a probe suitably dimensioned to be held in the hand and having a two-part casing consisting of hollow bottom and top parts 11 and 12, which are threaded together at a transverse joint 15. Bottom part 11 is, as shown in FIG. 3, octagonal in shape so that the instrument does not roll on a slanted surface. Interiorly of the casing is differential transformer winding 13 of a type well known in this field, not herein shown in detail, which is enclosed in a toroidal covering 14. A set screw 21 in portion 11 secures the transformer housing 14 in accurate adjusted longitudinal position. The lead wires 16 of the transformer connect to socket elements 17 at the top which, in normal usage, are connected by means of plug 18 inserted through the end of top 12 to lead wires 19 and thence to the amplifier and recording portions of the instrument (not shown) of a well known type.

The tip 22 of bottom 11 is frusto-conical terminating in a recessed peripheral step 23, for a purpose hereinafter explained. There is an annular flat end 24 inside step 23 and inward of flat end 24 is cylindrical bore 26. Flat end 24 is formed with a circumferential groove 27 which has a diameter of about 0.020" is semicircular cross-section and is spaced out from bore 26 a distance of about 0.005". The purpose of groove 27 is to improve the pressure point indication of the differential transformer excitation record. Fitting across flattened end 24 and the window 28 at the end of bore 26 and thence into step 23 is a thin stainless steel diaphragm 29 of about 0.125" thickness. Diaphragm 29 has a circular disc of a diameter equal to the outside diameter of end 24 and a peripheral flange 31 fitting into step 23. A compression ring 32 is force fit over flange 31 and fills out step 23 to the contour of conical tip 22 and secures diaphragm 29 in place by compression against step 23. The diaphragm 29 is extremely flexible and the annular groove 27 improves flexibility thereof. Hence, when tip 23 is pressed against the eyeball (FIG. 3), intraocular pressure causes deflection of the diaphragm 29 from a planar configuration.

Interiorly of the casing 11, 12 is a non-ferrous probe rod 36 which is formed with points 37, 38 at bottom and top. Bottom point 37 bears against the inside of diaphragm 29 and it is secured centrally in place by a dab of epoxy resin 39. Top point 38 is held in place by penetration of rubber second diaphragm 41 which closes off the upper end of the transformer covering 14. By reason of the resiliency of rubber diaphragm 41 rod 36 may move axially responsive to deflection of the steel diaphragm 29. Positioned on rod 36 is a ferrous differential transformer core 42, which is located at the electrical center of differential transformer 13, the transformer being movable along the axis of rod 36 when the set screw 21 is loosened to adjust such location.

In use, with the lead wires 19 of the transformer connected to an amplifier and recorder, the user brings the tip 22 of the nose piece into contact with the eyeball in a deft, rapid movement which does not cause discomfiture. The relatively stiff margin of the diaphragm 29 overlying flat end 24 causes compression of the cornea to a flat area. Intraocular pressure causes deformation of diaphragm 29, which in turn causes axial movement of the ferrous core 42 and this results in excitation of transformer 13, which can be amplified and recorded. Such excitation is extremely sensitive because of the extreme flexibility of the thin stainless diaphragm 29 and groove 27 which imparts additional flexibility. Inasmuch as the instrument has been calibrated against standard intraocular pressures, any variation therefrom is diagnosed as an indication of glaucoma.

Between patients, the instrument may be sterilized as in the case of other instruments of this general type by means of alcohol and similar purpose solutions. Inasmuch as the annular gap between point 37 and bore 26 of tip 22 is closed off by diaphragm 29, there is no opportunity for transmission of infection from one patient to the other by germs entering this gap, nor is there any possibility of clogging of this space which would prevent accurate deflection of rod 36. The flat, smooth steel disc surface 29 is more comfortable to the cornea when applied than is the rubber sheath which is conventionally placed over the end of conventional tonometer tips.

Although the foregoing invention has been described in some detail, by way of illustration and example for purposes of clarity of understanding, it is understood that certain changes and modifications may be practiced within the spirit of the invention and scope of the appended claims.

What is claimed is:

1. In a tonometer handpiece, a casing formed with a tip, said tip formed with central bore defining a window and a relatively flat annular end surrounding said bore, a thin, flat, flexible, metallic diaphragm closing off the window at the end of said bore and overlying said flat end, means for securing said diaphragm in place on said tip, a rod in said bore fixed for movement with said diaphragm, mounting means mounting said rod in said bore for movement in an axial direction responsive to deflection of said diaphragm from a planar condition, an armature moveable with said rod, and a differential transformer electrically centered relative to said armature, the bottom end of said rod fitting against the inside of the center of said diaphragm, said bottom end of said rod cemented to said diaphragm.

2. A handpiece according to claim 1, in which said flat annular end is formed with an annular shallow groove spaced a slight distance out from said bore to improve the pressure point indication of deflection of said diaphragm.

3. A handpiece according to claim 1, in which a step is cut into the periphery of said flat annular end, said diaphragm is circular with an inward turned peripheral flange fitting into said step and said first mentioned means comprises a ring forced over said flange and gripping said flange against the edge of said step.

4. A handpiece according to claim 1, in which the top end of said rod is pointed and in which said mounting means comprises a rubber second diaphragm across the top of said transformer into which the pointed end of said rod penetrates.

5. A handpiece according to claim 1, in which said mounting means comprises a rubber second diaphragm transversely mounted in said casing, the upper end of said rod penetrating said second diaphragm.

References Cited by the Examiner
UNITED STATES PATENTS

| | | | |
|---|---|---|---|
| 1,423,293 | 7/22 | Amsler | 73—80 |
| 2,519,681 | 8/50 | Mages | 73—80 |
| 2,708,928 | 5/55 | Zenatti | 73—80 X |

RICHARD C. QUEISSER, *Primary Examiner.*
DAVID SCHONBERG, *Examiner.*